United States Patent [19]

Angus

[11] 4,345,174

[45] Aug. 17, 1982

[54] ELECTROMAGNETIC ENGINE

[75] Inventor: Neil H. Angus, Sebring, Fla.

[73] Assignee: Angus Motor Corporation, Fort Lauderdale, Fla.

[21] Appl. No.: 269,332

[22] Filed: Jun. 1, 1981

[51] Int. Cl.³ .............................................. H02K 41/00
[52] U.S. Cl. ....................................... 310/24; 310/34; 310/35
[58] Field of Search .................. 310/23, 24, 34, 35

[56] References Cited

U.S. PATENT DOCUMENTS

| | | | |
|---|---|---|---|
| 1,018,309 | 2/1912 | Ford | 310/24 |
| 1,131,614 | 3/1915 | Radtke | 310/24 |
| 1,347,002 | 7/1920 | Baule | 310/24 |
| 1,436,245 | 5/1922 | Geisler | 310/24 |
| 1,886,040 | 11/1932 | Moodyman | 310/24 |
| 2,639,544 | 5/1953 | Coffin | 310/24 |
| 3,328,656 | 6/1967 | Dotson | 310/24 |
| 3,676,719 | 7/1972 | Pecci | 310/24 |
| 4,019,103 | 4/1977 | Davis et al. | 310/24 |
| 4,093,880 | 6/1978 | Teal | 310/24 |

Primary Examiner—Donovan F. Duggan
Attorney, Agent, or Firm—Richard M. Saccocio

[57] ABSTRACT

An electromagnetic engine and method capable of producing a high amount of mechanical power at a high efficiency. An electromagnet or piston operates within a cylinder having a stepped bore therein. The cylinder reciprocates while the piston only pivots. The power stroke occurs for a short duration midway between a top dead center position and a bottom dead center position. Axial magnetic forces are used to impart axial motion to the cylinder which causes rotation of the crankshaft. A plate is positioned within the cylinder up against the step. When the plate is in close proximity to the piston or electromagnet, and the centerline of the cylinder is at a right angle to the throw of the crankshaft, the electromagnet is energized. Sequential energization of each of a plurality of piston-cylinder combinations occurs during each crankshaft rotation.

19 Claims, 5 Drawing Figures

ELECTROMAGNETIC ENGINE

BACKGROUND OF THE INVENTION

1. Field of the Invention

This invention relates in general to the field of magnetic energy-conversion devices, and in particular to apparatus for converting magnetic energy created by electricity into rotating mechanical energy.

2. Description of the Prior Art

The creation of magnetic energy by electricity is well known in the art. The most prevalent use of such energy is, of course, by electric motors. The direct use of such energy, however, is somewhat limited in industry to those applications where, for example, the magnetic attraction forces are used to lift objects or to separate magnetic particles from compounds containing both magnetic and nonmagnetic particles. A more prevalent direct use of magnetic energy is found wherever electrical solenoids are used. Such usage comprises making and breaking electrical contacts, opening and closing valves, and hot-melt glue guns or other such applications where a predetermined amount of a product is dispensed upon demand or at specific time intervals. More recently, the field created by magnetic energy has been used in particle acceleration devices such as cyclotrons and syncrotrons where electrons have been accelerated to within 99.999995% of the speed of light.

The fascination associated with the potential uses of magnetic energy has led to a number of devices other than the above whereby electrical energy is converted into magnetic energy which is then converted into mechanical rotational motion. These devices are generally known as electromagnetic engines. They differ from the common electric motor in that they contain one or more pistons attached to a crankshaft which provides the mechanical output. U.S. Pat. No. 1,018,309, issued in 1912, by H. J. Ford, is one such device. This invention discloses a plurality of solenoids coupled to crank portions of a crankshaft. The solenoids include a steel plate located at one end thereof to enhance the magnetic forces and which magnetically actuate the plunger-core of the solenoid. Each solenoid is sequentially energized to impart rotational motion to the crankshaft. U.S. Pat. No. 1,436,245, issued in 1922, is another such device comprising an improvement on the original above-described electromagnetic engine. Again, solenoid windings surround a cylinder within which a plunger-core reciprocates. Electrical contacts are placed in the upper portion of the cylinders which make and break electrical power to the solenoid when the plunger-core reaches its uppermost position.

U.S. Pat. No. 1,886,040, issued in 1932, is yet another improved version of the basic electromagnetic motor, the improvement comprising adjustable means to alter the time interval during which the solenoids are energized in order to increase or decrease the speed of the engine.

U.S. Pat. No. 2,639,544, issued in 1953, is a toy engine kit which uses a solenoid electromagnetic motor to simulate the operation of an internal combustion engine for educational purposes. The typical electromagnetic motor is disclosed in this teaching. In one arrangement of an imitated engine, the inventor discloses a radial electromagnetic engine having up to 12 cylinders. The radial version again utilizes solenoid windings around a cylinder having a plunger-core slidingly actuated therein.

The continuing quest to attain an electromagnetic engine having a high efficiency and the ability to produce a substantial output resulted in the teachings of U.S. Pat. No. 3,328,656, which was issued in 1967. The inventor again began with the now standard plunger-core solenoid engine having windings around the cylinder wall. In this art, however, the inventor discloses the use of a high-quality factor coil assembly to achieve a sizeable mechanical output. U.S. Pat. No. 3,676,719, issued in 1972, is still another attempt to achieve a high output from an electromagnetic engine of the same type previously described. Here, the connecting rod of a plunger-core is eccentrically connected to a driving gear which meshes with a driven gear carried by a drive shaft to gain a mechanical advantage and cause rotation of the drive shaft.

U.S. Pat. No. 4,019,103, issued in 1977, discloses yet another electromagnetic engine. In this teaching, a pair of solenoids each containing three separate but connected windings are wound on a cylinder. A piston-plunger reciprocates within the cylinder and is connected to a crankshaft. A commutator connected to the crankshaft selectively energizes the solenoids. The primary object of the arrangement is to recapture a portion of the electrical energy supplied to operate the motor in order to increase the efficiency of the motor.

In U.S. Pat. No. 4,093,880, the inventor discloses yet another attempt to increase the efficiency of an electromagnetic motor. This is accomplished by a plurality of solenoid coil cylinders each having a plunger-core positioned therein, with the cylinders arranged in a single plane. At least one of the solenoid structures is provided with an air compressor to provide a combination device capable of producing a mechanical output in conjunction with high pressure air.

In accordance with the attempts disclosed by the prior art, there is an obvious need to effectively increase the power output and the efficiency of electromagnetic motors before they can in fact be considered to be competitive with other engines and motors such as electric motors and internal combustion engines. And, based on the noncommercial use of the disclosed engines, the need for an electromagnetic engine having a high efficiency coupled with a high power output still exists today. Indeed, in this age of shrinking energy sources, the need for conservation of energy assumes an even more important place in our society.

Accordingly, a primary object of the present invention is to provide an electromagnetic engine which is capable of producing a high mechanical output.

Another primary object of the present invention is to provide an engine powered by electromagnets in a manner whereby electrical power is efficiently converted into mechanical power.

A further object of the present invention is to provide an electromagnetic engine having one or more electromagnets, each of which operates over short distances in order to utilize the maximum available magnetic forces.

A still further object of the present invention is to provide an electromagnetic engine having one or more electromagnets which when activated exert substantially axial magnetic forces.

SUMMARY OF THE INVENTION

The problems of the prior art are overcome by the present invention which provides an electromagnetic reciprocating type of engine having a number of new and unique features not previously known or used. In the illustrated embodiment, thirty-six piston-cylinders radially arranged are connected to a crankshaft. Each cylinder having a connecting rod integrally connected thereto is pivotally attached to the crankshaft. The cylinder is provided with a stepped internal cylindrical opening which is closed at the connecting rod end and open at the other end. A soft iron plate is positioned within the cylinder up against the step therewithin, the plate is spring loaded so as to maintain its position against the step. An electromagnet is fitted within the open end of the cylinder and is pivotally attached to a supporting structure surrounding the cylinders. In operation, each electromagnet is progressively activated for ten degrees of crankshaft rotation. Activation occurs when the free end of the electromagnet is in close proximity to the iron plate and when the connecting rod is at a right angle to the eccentric arm of the crankshaft. A unique override arrangement allows the cylinder to reciprocate while the piston remains stationary.

BRIEF DESCRIPTION OF THE DRAWINGS

Further features, objects, and advantages will be evident from the following detailed description of the preferred embodiments of the present invention taken in conjunction with the accompanying drawings in which.

DESCRIPTION OF THE PREFERRED EMBODIMENTS

Figure 1:
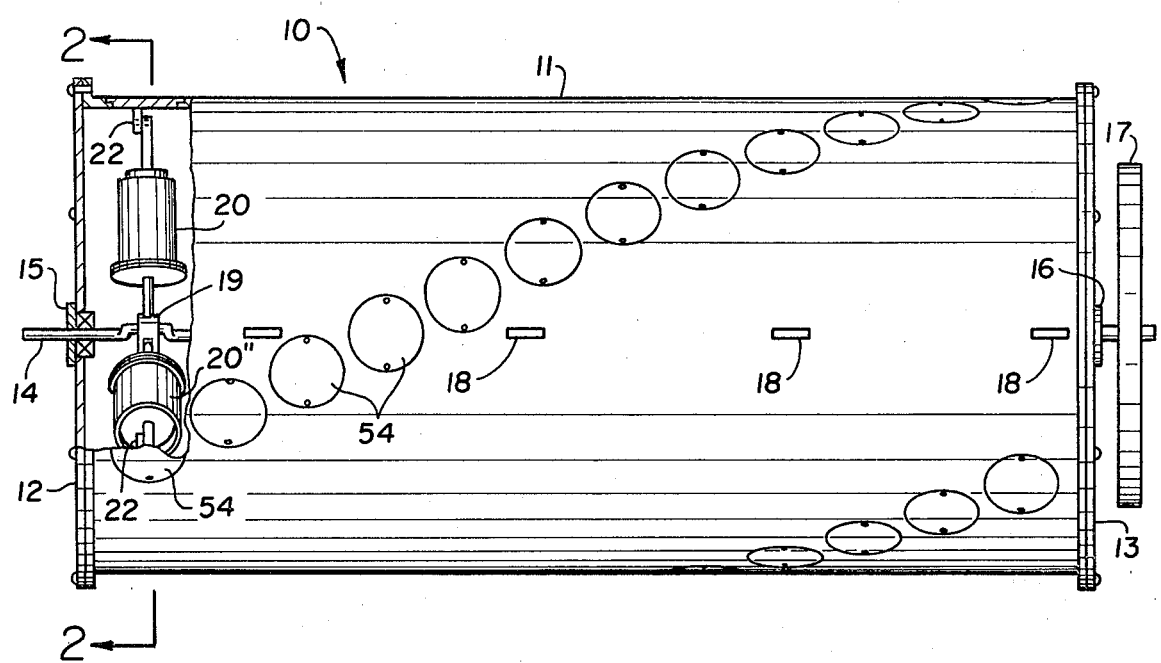
FIG. 1 is a side elevational view, partially away, of one embodiment of the present invention.

Referring now to FIG. 1 of the drawings, there is depicted therein a thirty-six cylinder engine having a radial configuration. There are twelve banks of cylinders, three cylinders per bank. Each bank of cylinders is staggered or offset by ten degrees relative to the next bank of cylinders. Other engine configurations, such as one having four banks of nine cylinders each is equally suitable. The engine 10 is an electromagnetic engine in that it utilizes electrical energy to produce magnetic forces which forces are then uniquely converted into a mechanical output.

Engine 10 as depicted utilizes a support structure the design of which is not critical to the operation of the invention. A substantially cylindrical shell 11 having end plates 12 and 13 comprises such a support structure. Other shapes and designs of structures well known in the art may be alternatively used without departing from the intent and objectives of the present invention. For convenience, end plates 12 and 13 may be bolted to shell 11 at the adjoining flanges thereof. A journaled crankshaft 14 is supported within shell 11 at end plates 12 and 13 and extends therethrough. Collars 15 and 16 axially retain crankshaft 14 at end plates 12 and 13. A flywheel 17 is attached to crankshaft 14 and is retained thereon in suitable fashion. Brackets or supports 18 may be welded to shell 11 so that the engine 10 can be mounted on a base or to a vehicle frame.

Figure 2:
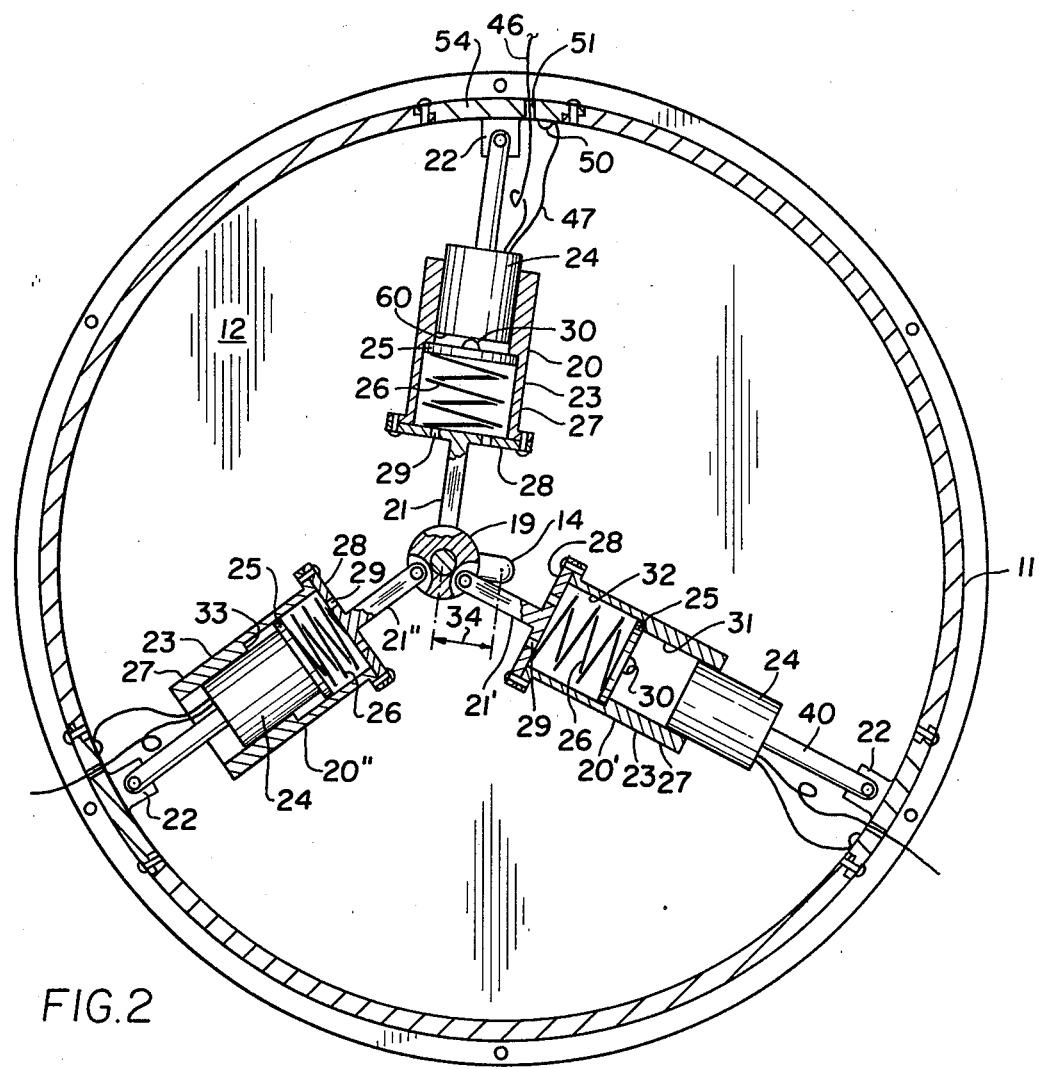
FIG. 2 is a cross-sectional view of the embodiment shown in FIG. 1 taken along the line 2—2, illustrating the details and the method of operation of the electromagnet pistons within cylinders attached to a crankshaft.

Referring to FIGS. 1 and 2, three electromagnet piston-cylinders 20, 20', and 20" are shown attached to crankshaft 14. Piston-cylinder 20 includes an articulated or master connecting rod 21, the circular portion 19 of which is pivotally connected to the throw 34 of crankshaft 14. Connecting rods 21' and 21" are pivotally connected to circular portion 19 of master connecting rod 21. Brackets 22 attached to shell 11 provide for pivotally attaching the pistons 27 to the engine support structure.

The details of piston-cylinders 20, 20', and 20" are more clearly shown in FIG. 2. Piston-cylinder 20 is at a position representing the beginning of a power stroke; piston-cylinder 20' is at a substantially top dead center position; while, piston-cylinder 20" is slightly before a bottom dead center position. Each piston-cylinder assembly comprises a cylinder 23, a piston or electromagnet 24, a circular plate 25, and a spring 26. Cylinder 23 consists of a cylindrical body portion 27 and a bottom portion 28 which are bolted together. Air vent holes 29 and 30 are provided in bottom portion 28 and in body portion 27, respectively. A stepped concentric opening is bored in cylinder 23. Bore diameter 31 is slightly smaller than bore diameter 32, the junction of which results in a step or ledge 33. The length of bores 31 and 32 are consistent with the length of electromagnet 24 and the stroke of the engine 10 as determined by the rotational diameter of throw 34 and master rod 21. Bore 31 is always in contact with some portion of the outer diameter of piston 24 throughout the engine stroke.

A low friction sliding fit exists between piston 24 and bore 31 of cylinder 23. Circular plate 25 is made from close-grained soft white iron or other like material which does not retain magnetism. A low friction sliding fit also exists between plate 25 and bore 32. The normal position of plate 25 is up against step 33 and is maintained in this position by spring 26. Spring 26 is a relatively light coil spring which needs only to exert sufficient force to lift the weight of plate 25.

Figure 3:
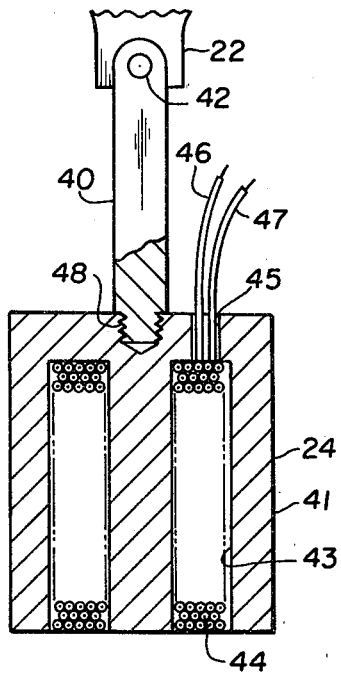
FIG. 3 is a cross-sectional view of a piston of FIG. 2 illustrating additional details thereof.

A typical electromagnet or piston 24 is shown in cross section in FIG. 3. Piston 24 is provided with an arm 40 extending axially from casing 41 to support bracket 22. An appropriate pin 42 is used to pivotally connect arm 40 to bracket 22. Casing 41 has an annular groove 43 provided therein and within which groove 43 suitable electrical windings 44 are provided. An opening 45 in the top end of casing 41 allows for ingress and egress of electrical conductors 46 and 47 which are connected to each end of electrical windings 44 for the purpose of supplying electrical power to windings 44. FIG. 3 also depicts one way to attach arm 40 to casing 41. The method shown is a simple shouldered threaded connection 48. Other suitable methods of connection well known in the art may be alternatively used. Casing 41, like plate 25, is made from close-grained soft white iron or other like material which does not retain magnetism.

Figure 4:
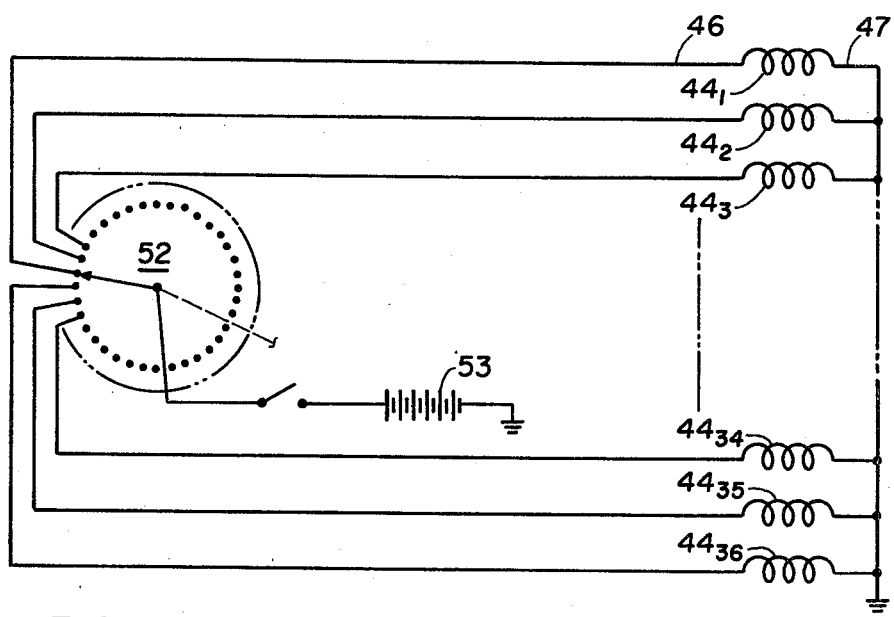
FIG. 4 is a schematic diagram of an electronic circuit arrangement for the motor of FIG. 1.

Conductor 47 of windings 44 of electromagnet 24 is connected by a screw 50 to shell 11 which provides a common ground for the windings 44 of all thirty-six electromagnets 24 in the engine 10. The other conductor 46 of winding 44 of electromagnet 24 is routed through an opening 51 in shell 11 to a distributor 52 which is schematically depicted in FIG. 4. Distributor 52 is connected to a battery 53 or other like power source which is adapted to provide a flow of current at the proper voltage through windings $44_1$–$44_{36}$ to cause sequential operation of the electromagnets 24.

In FIGS. 1 and 2, a circular plate 54 is shown connected to shell 11 at each piston-cylinder 20 location. Plate 54 allows for access to the piston-cylinders 20 and the associated components for purposes of assembly and maintenance.

The operation of the inventive engine 10 will now be described. It is first to be noted that the pull of an electromagnet varies as a function of the area of the holding surface muliplied by the square of the flux density divided by a constant. Also, that the flux density increases as the distance to the holding surface decreases. Hence, changes in the flux density is the greatest contributor to the pulling force of an electromagnet. Experiments conducted by the inventor have shown that an electromagnet powered by two "D" cell batteries can produce a holding force of 500 pounds and that the magnetic attraction force varies with the distance between the surface of the electromagnet and the item to be lifted. It was found, that at a distance of one-eighth of an inch, the force is approximately 7.8 pounds; at a distance of approximately one-twelfth of an inch the force is 31 pounds; at a distance of approximately one/twenty-fourth of an inch the force is 125 pounds; and, as stated, at contact, the force is 500 pounds. Thus, a usable force begins when the distance is one-eighth of an inch and increases rapidly thereafter.

The inventive apparatus illustrated and described herein utilizes a piston stroke of one-eighth of an inch—corresponding to a crankshaft rotation of ten degrees. Hence, each of the thirty-six piston-cylinders 20 fires or produces a power stroke during each rotation of crankshaft 14. FIG. 2 shows the piston-cylinder 20 at a position where electromagnet 24 is spaced approximately one-eighth of an inch away from plate 25 with the latter being firmly held against ledge 33 by spring 26. When the angle between the centerline of throw 34 and the centerline of rod 21 is approximately 85°, electromagnet 24 is energized. At this point in the sequence of operation, no other electromagnet is energized. Hence, the pull by electromagnet 24 is substantially normal to the centerline of piston-cylinder 20. Furthermore, the pulling force is at a substantially right angle to the throw 34 of crankshaft 14. In this manner, maximum torque is being exerted upon crankshaft 14. Electromagnet 24 pulls plate 25 up towards the face 60 of electromagnet 24. In so doing, cylinder 23 and connecting rod 21 are also pulled upwards which in turn rotates crankshaft 14. The pulling force continues for a crankshaft angle of ten degrees at which time the face 60 of electromagnet 24 is in contact with the face of plate 25. Distributor 52 then cuts off the electricity to electromagnet 24 and energizes the next electromagnet-cylinder combination which is substantially at a right angle to its crankshaft throw arm. The procedure repeats itself for each of the thirty-six electromagnet-cylinder combinations for each crankshaft rotation.

A unique aspect of the present invention is the override feature of the piston-cylinders 20. This is accomplished by allowing electromagnet 24 to pivot but otherwise be restrained. The cylinder 23 moves up and down relative to a pivoting but otherwise stationary piston (electromagnet 24). This may be seen by referring to FIG. 2. As previously stated, the position of piston-cylinder 20 is at the initiation of the power stroke. The faces of plate 25 and electromagnet 24 are separated by approximately one-eighth of an inch which corresponds to the beginning of the high end of the attractive force produced by electromagnet 24. At the end of ten degrees of crankshaft rotation (clockwise), the faces of plate 25 and electromagnet 24 are in contact with each other. Continued crankshaft rotation for approximately 90° causes cylinder 23 and electromagnet 24 to move axially inward relative to each other (actually only cylinder 23 moves axially, electromagnet 24 pivots on bracket 22). Even though no electric power is being supplied to the electromagnet 24, circular plate 25 is still in contact with electromagnet 24 and begins to move downward relative to cylinder 23 toward bottom portion 28. Spring 26 is compressed to a maximum at this point. This is partially shown by referring to piston-cylinder 20" in FIG. 2. After approximately 270° of crankshaft rotation, piston-cylinder 20 will achieve a top dead center position. That is, when piston 24 and cylinder 23 are fully extended away from each other. This may be approximately visualized by referring to the position of piston-cylinder 20' in FIG. 2. After another 90° of crankshaft rotation, piston-cylinder 20 is again at the beginning of another power stroke. It is again to be noted that during the above-described 360° of rotation of crankshaft 14, each of the thirty-six piston-cylinders will have undergone a power stroke corresponding to 10° of crankshaft rotation. In this manner, an electromagnetic engine producing an amount of power never before achieved results.

Figure 5:
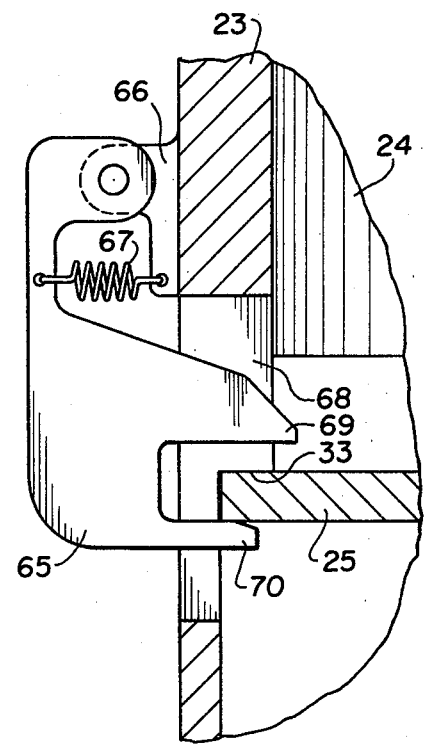
FIG. 5 is a partial cross-sectional view of another embodiment of a piston-cylinder arrangement of the inventive electromagnetic engine.

FIG. 5 illustrates an alternative to the use of spring 26. In this embodiment, a latch 65 is used to hold plate 25 up against ledge 33 of cylinder 23. Piston 23 is slightly magnetic while plate 25 is a weak permanent magnet or, vice versa, in this embodiment. Latch 65 is pivotally connected to a boss 66 attached to cylinder 23. Spring 67 maintains the position of latch 65 as it is shown in FIG. 5, with plate 25 being retained against ledge 33 by plate retainer portion 70. A cutout 68 in the wall of cylinder 23 provides room for the pivoting action of latch 65. When the piston or electromagnet 24 moves downward relative to cylinder 23, the lower edge of piston 24 contacts the trip portion 69 of latch 65 causing the same to be pivoted away from cylinder 23 thereby releasing plate 25 and allows the initiation of a power stroke. The magnetic properties of plate 25 and piston 24 cause the plate 25 to remain attached to piston 24 after the completion of the power stroke. Plate 25 is still so attached until 180° of crankshaft rotation is achieved, at which point plate 25 contacts ledge 33 causing separation of plate 25 from piston 24. When piston 24 clears trip portion 69, the plate retainer portion 70 rotates back under plate 25 again retaining the same up against ledge 33. As an alternative, to retain plate 25 against piston 24, plate 25 is made from a magnetic material and electromagnet 24 is energized by a low voltage during the override portion of the stroke.

In a still further embodiment of the present invention, the spring 26 of FIG. 2 and the latch 65 of FIG. 5 may be both dispensed with. In this embodiment either plate 25 or ledge 33 comprise a permanent magnet with the other being made from a magnetic material. Face 60 of piston 24 must also be either magnetized or made from a magnetic material. In this manner plate 25 will either be retained against ledge 33 or attached to face 60 of piston 24 depending upon the relative positions of plate 25, cylinder 23 and piston 24.

While the invention has been described, disclosed, illustrated, and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. Electromagnetic apparatus for converting electrical energy into mechanical power comprising:
    a support structure;
    a crankshaft mounted on said support structure and arranged to rotate thereon;
    at least one electromagnetic piston-cylinder combination comprising an electromagnetic piston pivotally attached to said support structure, a cylinder pivotally attached to a throw of said crankshaft and in sliding engagement with said piston, said piston being positioned within said cylinder;
    an electrical power source for energizing said electromagnet; and
    means for using substantially axial magnetic forces to impart axial motion to said cylinder which imparts rotational motion to said crankshaft.

2. The electromagnetic apparatus of claim 1, wherein said means for using axial magnetic forces comprises a first diameter within said cylinder, a second diameter within said cylinder with a step therebetween, a circular plate positioned within and in sliding engagement with second inside diameter, means for holding said plate up against said step for allowing said plate to reciprocate within said cylinder, with said electromagnetic piston being arranged in sliding engagement with said first inside diameter.

3. The electromagnetic apparatus of claim 1, wherein said means for holding said plate up against said step and allowing for reciprocation thereof comprises a compressible spring positioned within said second inside diameter.

4. The apparatus of claim 3, including vent means for allowing air between said plate and said piston within said cylinder to be vented during reciprocation of said plate and said cylinder.

5. The apparatus of claim 2, wherein said means for holding said plate up against said step and for allowing reciprocation thereof comprises said plate comprising a permanent magnet and said step and said piston being made from a magnetic material.

6. The apparatus of claim 2, wherein said means for holding said plate up against said step and for allowing reciprocation thereof comprises magnetic attraction forces between said piston and said plate, and said step.

7. The apparatus of claim 2, wherein said means for holding said plate up against said step and for allowing reciprocation thereof comprises a spring-loaded latch pivotally attached to said cylinder, said latch having a plate retaining arm and an actuating arm whereby the relative motion of said piston actuates said activating arm pivoting said latch and said retaining arm away from said plate, and magnetic means for retaining said plate against said piston.

8. The apparatus of claim 2, wherein said electrical source is activated when the axial centerline of said piston-cylinder combination is at an angle of substantially 90° to the centerline of said throw of said crankshaft.

9. The apparatus of claim 8, wherein said electrical source is activated for the equivalent of approximately 10° of each crankshaft rotation.

10. The apparatus of claim 9, including a total of thirty-six piston-cylinder combinations radially arranged about said crankshaft with each piston-cylinder being sequentially activated for said equivalent of 10° of crankshaft rotation for each crankshaft rotation.

11. The apparatus of claim 8, wherein said plate is approximately one-eighth of an inch from said piston when said power source is activated.

12. A method for converting electrical energy into mechanical power in an electromagnetic engine having a support structure, a crankshaft mounted on and arranged to rotate thereon, at least one electromagnetic piston-cylinder combination comprising an electromagnetic piston pivotally attached to said support structure a cylinder pivotally attached to a throw of said crankshaft and in sliding engagement with said piston said piston being positioned within said cylinder and an electrical power source for energizing said electromagnet comprising the step of using substantially axial magnetic forces for imparting motion to said cylinder to cause rotational motion of said crankshaft.

13. The method of claim 12, including the step of imparting axial motion to said cylinder by a plate positioned up against a step within said cylinder when said electromagnet is energized with said electromagnet drawing said plate and said cylinder toward said electromagnet.

14. The method of claim 13, including the step of imparting said axial motion to said cylinder when the centerline of said piston-cylinder combination and the centerline of the throw of the crankshaft are substantially at an angle of 90° to each other.

15. The method of claim 14, including the step of energizing the electromagnet for the equivalent of 10° of crankshaft rotation.

16. The method of claim 15, including the step of energizing the electromagnet when said plate is approximately one-eighth of an inch away from said electromagnet.

17. The method of claim 13, including the step of energizing the electromagnet when said cylinder and said piston are substantially midway between a top dead center and a bottom dead center position.

18. The method of claim 17, including the step of energizing the electromagnet for the equivalent of 10° of crankshaft rotation.

19. The method of claim 18, including the step of radially arranging thirty-six piston-cylinder combinations about said crankshaft and sequentially energizing each piston-cylinder combination for a total of the equivalent of 10° of crankshaft rotation for each crankshaft rotation.

* * * * *